(12) United States Patent
Sugimoto et al.

(10) Patent No.: US 9,891,634 B2
(45) Date of Patent: Feb. 13, 2018

(54) SOLENOID VALVE CONTROL SYSTEM, A CONTROL VALVE SYSTEM, AND A METHOD OF CONTROLLING ELECTRONIC VALVE

(71) Applicant: Nidec Tosok Corporation, Zama, Kanagawa (JP)

(72) Inventors: Yoshihisa Sugimoto, Zama (JP); Jyunichi Sakashita, Zama (JP); Naoki Kobayashi, Zama (JP)

(73) Assignee: NIDEC TOSOK CORPORATION, Zama, Kanagawa (JP)

( * ) Notice: Subject to any disclaimer, the term of this patent is extended or adjusted under 35 U.S.C. 154(b) by 332 days.

(21) Appl. No.: 14/847,305

(22) Filed: Sep. 8, 2015

(65) Prior Publication Data
US 2016/0070272 A1 Mar. 10, 2016

(30) Foreign Application Priority Data

Sep. 8, 2014 (JP) .................................. 2014-181979

(51) Int. Cl.
*G05D 19/02* (2006.01)
*G05D 7/06* (2006.01)
(Continued)

(52) U.S. Cl.
CPC ....... *G05D 7/0635* (2013.01); *F15B 13/0442* (2013.01); *F15B 21/008* (2013.01);
(Continued)

(58) Field of Classification Search
CPC ..... Y10T 477/69362; F16H 2061/0209; F16H 2061/0255; G05D 7/0635; F15B 13/0442;
(Continued)

(56) References Cited

U.S. PATENT DOCUMENTS 8,831,843 B2 *  9/2014  Kamio ................ F16K 31/0675
                                                            701/58
2009/0222179 A1 *  9/2009  Zheng ................ G05D 16/2013
                                                            701/58
(Continued)

FOREIGN PATENT DOCUMENTS

EP              1041329 A2 * 10/2000 .......... F15B 13/0442
JP         H11287351 A      10/1999
JP        2009234522 A      10/2009

*Primary Examiner* — Roger L Pang
(74) *Attorney, Agent, or Firm* — Cantor Colburn LLP

(57) ABSTRACT

A solenoid valve control system comprising a solenoid valve drive circuit applying a drive current to the solenoid valve; a pressure data calculation unit calculating a pressure data including a band and a cycle of pressure fluctuation from a pressure value; a pressure hysteresis calculation unit calculating a difference between the pressure value when the drive current value is increased and the pressure value when the drive current value is decrease as a hysteresis amount; a vibration determination unit determining whether or not the pressure data is included in an area outside the pressure data range, which is outside a first predetermined range; a hysteresis determination unit determining whether or not the pressure hysteresis amount is included in an area outside the pressure hysteresis amount range, which is outside a second predetermined range; and a drive frequency adjustment unit adjusting a drive frequency based on the determination result.

10 Claims, 6 Drawing Sheets

(51) Int. Cl.
  *G05B 19/416* (2006.01)
  *F16K 31/06* (2006.01)
  *F15B 13/044* (2006.01)
  *F15B 21/00* (2006.01)
  *F16H 61/02* (2006.01)

(52) U.S. Cl.
  CPC ........ *F16K 31/0675* (2013.01); *G05B 19/416* (2013.01); *G05D 19/02* (2013.01); *F15B 2211/328* (2013.01); *F15B 2211/427* (2013.01); *F15B 2211/527* (2013.01); *F15B 2211/6306* (2013.01); *F15B 2211/6343* (2013.01); *F15B 2211/8616* (2013.01); *F15B 2211/8646* (2013.01); *F16H 2061/0209* (2013.01); *F16H 2061/0255* (2013.01); *G05B 2219/41303* (2013.01); *G05B 2219/41333* (2013.01); *Y10T 477/69362* (2015.01)

(58) Field of Classification Search
  CPC .............. F15B 21/008; F15B 2211/328; F15B 2211/8616; F15B 2211/6306; F15B 2211/427; F15B 2211/8646; F15B 2211/527; G05B 2219/41333; G05B 2219/41303
  USPC ...................................................... 701/57, 58
  See application file for complete search history.

(56) References Cited

U.S. PATENT DOCUMENTS

2009/0260352 A1* 10/2009 Wu ...................... F15B 1/021
                                                    60/327
2012/0186655 A1*  7/2012 Smirnov .............. G05D 7/0635
                                                    137/1
2014/0297137 A1* 10/2014 Kinoshita ............. F15B 19/005
                                                    701/51

* cited by examiner

SOLENOID VALVE CONTROL SYSTEM, A CONTROL VALVE SYSTEM, AND A METHOD OF CONTROLLING ELECTRONIC VALVE

CROSS REFERENCE TO RELATED APPLICATIONS

The present application claims priority under 35 U.S.C. § 119 to Japanese Application No. 2014-181979 filed Sep. 8, 2014, the entire content of which is incorporated herein by reference.

FIELD OF THE DISCLOSURE

The present disclosure relates to a solenoid valve control system, a control valve system, and a method of controlling electronic valve.

DESCRIPTION OF THE RELATED ART

Movement of an automatic transmission of an automobile is controlled by oil which is supplied from a control valve. In a control valve system, a proportional solenoid valve is provided to change output pressure of the oil. The proportional solenoid valve moves a plunger in accordance with a drive current supplied to the solenoid, and adjusts passage amount or output pressure of the oil. In general, a proportional solenoid valve is driven by a drive current (PWM signal).

When a proportional solenoid valve is driven, a problem of so-called oil-vibration, caused by oil pulsating on the output side of the solenoid valve, and a problem of so-called hysteresis, caused by disagreement between output pressure at the time of increasing and decreasing of the drive current, exist. When a frequency of the PWM signal, the drive current, increases, oil-vibration is reduced, but hysteresis is increased. Therefore, oil-vibration and hysteresis is in a trade-off relationship, and it has been difficult to reduce both at the same time.

A permissible range of oil-vibration and hysteresis is changed by an environmental condition in which the solenoid valve is used. For example, in a control valve system, a permissible range of oil pressure and a permissible range of hysteresis are different from each other based on the type of the automatic transmission to be controlled, vehicle type, number of engine revolutions, and other environmental conditions. Therefore, when using a solenoid valve, it must be controlled in consideration of the environmental conditions, and a common permissible range of oil-vibration and hysteresis.

SUMMARY OF THE DISCLOSURE

A preferred embodiment of the present disclosure is a solenoid valve control system which controls a solenoid valve interposed between an input side and an output side of an oil flow path, and comprises a solenoid valve drive circuit which applies drive current to the solenoid valve based on a predetermined drive current amount and drive frequency, a pressure data calculation unit which calculates a pressure data including a pressure fluctuation width and a pressure fluctuation cycle from a pressure value of the oil on the output side of the solenoid valve, a pressure hysteresis calculation unit which calculates a pressure hysteresis amount from a pressure value difference between the increasing and decreasing of the drive current value, a vibration determination unit which determines whether or not the pressure data is included in an area of pressure data range outside a first predetermined range, a hysteresis determination unit which determines whether or not the pressure hysteresis amount is included in an area of pressure hysteresis amount range outside a second predetermined range, and a drive frequency adjustment unit which adjusts the drive frequency based on the determination results from the vibration determination unit and the hysteresis determination unit.

A preferred embodiment is a method of controlling a solenoid valve, which is interposed between the input side and the output side of an oil flow path, by applying drive current thereto, comprising a) a pressure detection step for detecting a pressure value of the oil on the output side of the solenoid valve, b) subsequent to step a), a pressure data calculation step for calculating a pressure data including a pressure fluctuation width and a pressure fluctuation cycle from the pressure value, c) subsequent to step b), a vibration determination step for determining whether or not the pressure data is included in an area of pressure data range outside a first predetermined range, d) subsequent to step c), a pressure hysteresis calculation step for calculating a pressure hysteresis amount from a pressure value difference between the increasing and decreasing of the drive current value, e) subsequent to step d), a hysteresis determination step for determining whether or not the pressure hysteresis amount is included in an area of pressure hysteresis amount range outside a second predetermined range, and f) a drive frequency adjustment step for adjusting a drive frequency of the drive current based on the determination results of step c) and step e).

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Herein, a preferred embodiment of the present disclosure will be described with reference to the accompanying drawings.

<1. Structure of Control Valve System>

Figure 1:
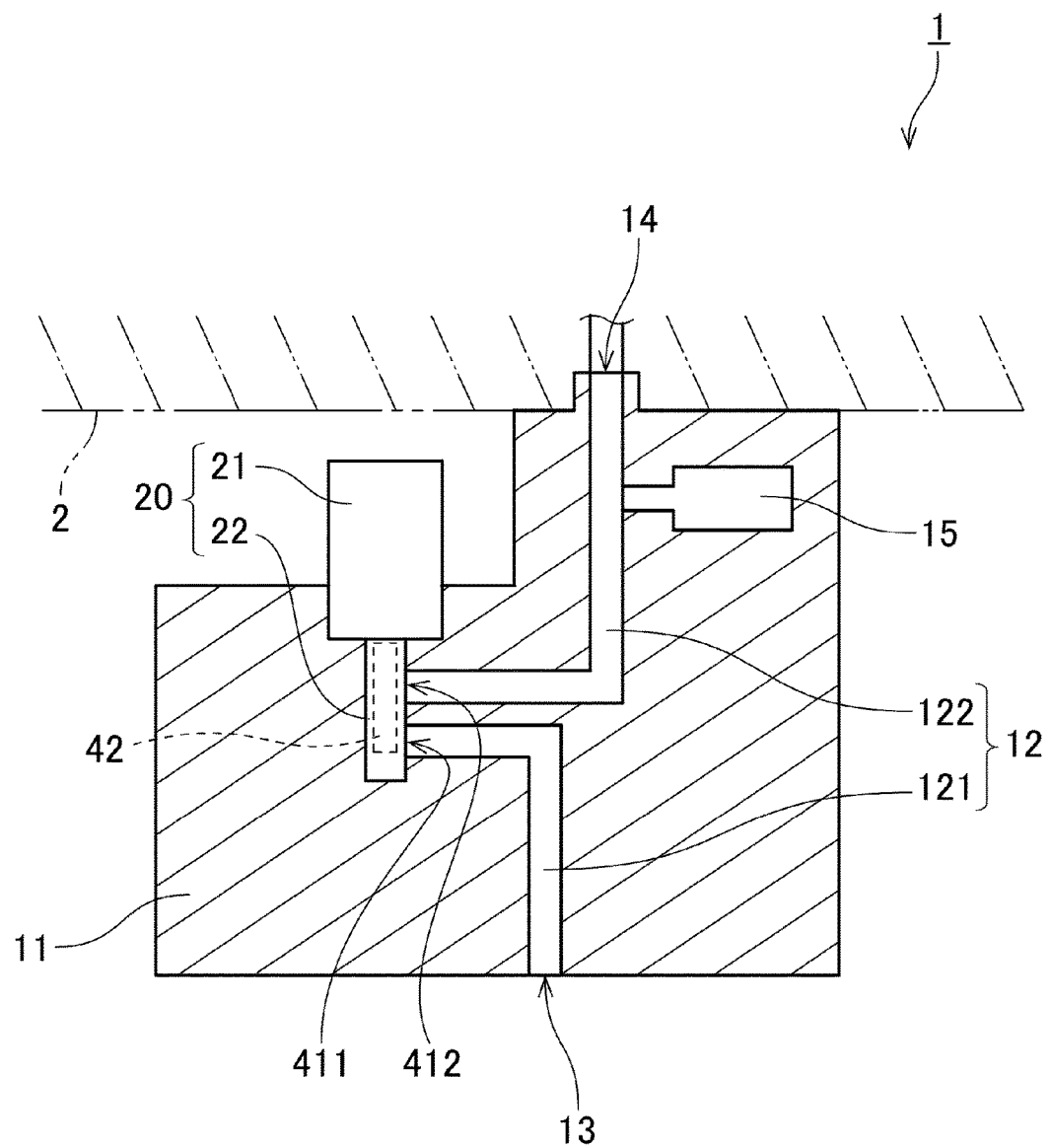
FIG. 1 is a rough cross-sectional view of a control valve system according to a preferred embodiment.

FIG. 1 is a rough cross-sectional view of a control valve system 1 according to a preferred embodiment. The control valve system 1 is a system provided to a vehicle, such as an automobile and the like, which controls the drive of an automatic transmission 2 disposed inside the vehicle by supplying oil (automatic transmission fluid, ATF) thereto. As shown in FIG. 1, the control valve system 1 comprises a valve body 11 which is formed by aluminum die casting and the like, and a solenoid valve 20.

A plurality of oil paths 12, which function as an oil flow path, are provided inside the valve body 11. The plurality of oil paths 12 are convoluted inside the valve body 11. FIG. 1 conceptually illustrates only a part of the plurality oil paths for a clear understanding. In the example shown in FIG. 1, the control valve system 1 is attached to a bottom surface side of the automatic transmission 2. The oil paths 12 are formed between an oil inlet 13 provided to a bottom surface of the valve body 11 and an oil-delivery port 14 provided to a top surface of the valve body 11.

The solenoid valve 20 in this preferred embodiment comprises a spool valve 42, a so-called spool valve, which will be described later. The solenoid valve 20 has a main body and a nozzle portion 22. The nozzle portion 22 has a substantially cylindrical shape and protrudes downward from the main body 21. An oil input port 411 and an oil output port 412 are provided on a lateral surface of the nozzle portion 22. Oil enters inside the nozzle portion 22 through the oil input port 411 and the oil output port 412. The solenoid valve 20 operates the spool valve 42 disposed inside the nozzle portion 22, and switches the communication state of the oil input port 411 and the oil output port 412.

The nozzle portion 22 is interposed among the oil paths 12 inside the valve body 11. Herein, a section closer to the input side than the nozzle portion 22 inside the oil paths 12 is referred to as a first oil path 121. A section closer to the output side than the nozzle portion 22 inside the oil paths 12 is referred to as a second oil path 122. The first oil path 121 connects the oil inlet 13 of the valve body 11 and the oil input port 411 of the nozzle portion 22. The second oil path 122 connects the oil output port 412 of the nozzle portion 22 and the oil delivery port 14 of the valve body 11.

When using the control valve system 1, oil is pressured by an oil pump which is not shown in the drawings, and flown into the first oil path 121 from the oil inlet port 13. The oil flows between the second oil path 122 and the automatic transmission 2 through the oil delivery port 14.

The control valve system 1 has a sensor 15 for measuring pressure and temperature of the oil. The sensor 15 is arranged inside the second oil path 122 which is closer to the output side than the nozzle portion 22, and measures pressure and temperature of the oil. In this preferred embodiment, the sensor 15 which measures oil pressure and oil temperature is a single unit sensor. A sensor for measuring oil pressure and a sensor for measuring oil temperature may be separately provided.

<2. Structure of Solenoid Valve>

Herein, structure of the solenoid valve 20 will be described in detail. For easy explanation, a direction parallel to a center axis 9 of the solenoid valve 20 is referred to as "axial direction", a direction orthogonal to the center axis 9 of the solenoid valve 20 is referred to as "radial direction", and a direction along a circular arc having its center on the center axis 9 of the solenoid valve 20 is referred to as "circumferential direction".

Figure 2:
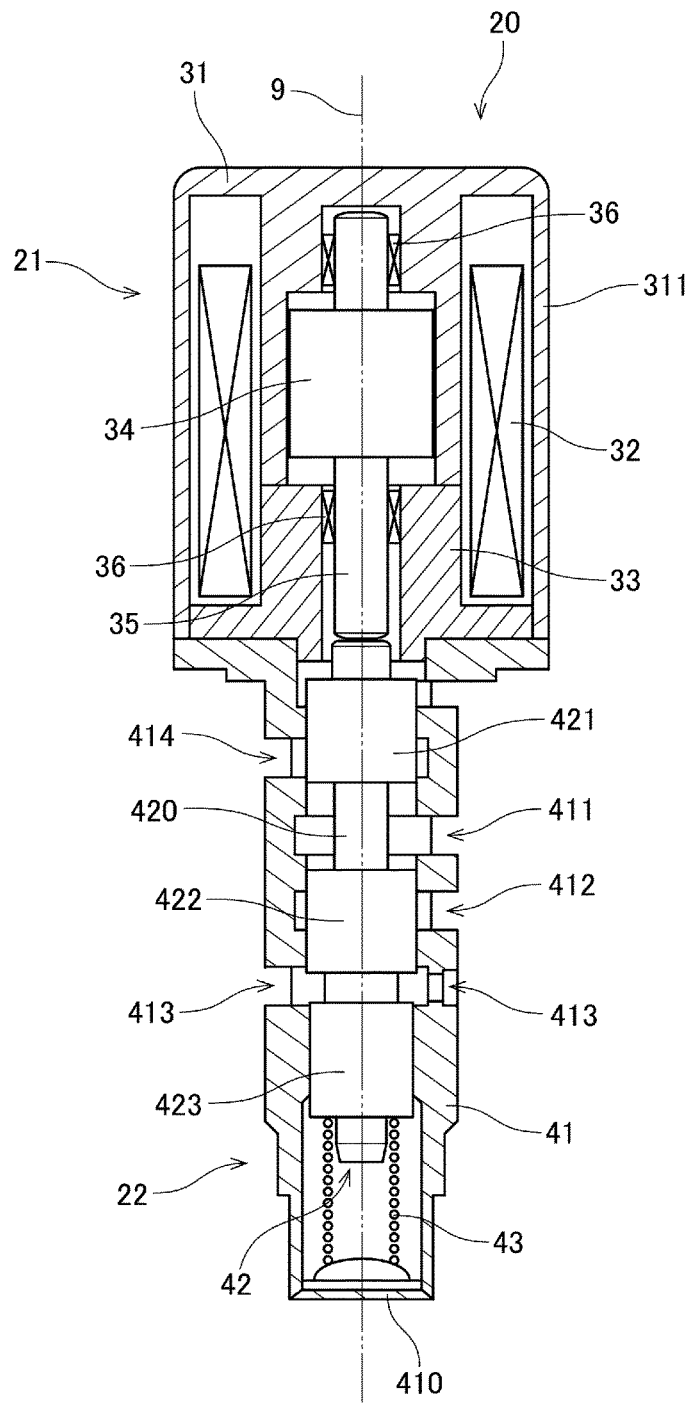
FIG. 2 is a cross-sectional view of a solenoid valve according to the preferred embodiment.

FIG. 2 is a cross-section of the solenoid valve 20. The solenoid valve 20 is a so-called proportional solenoid valve, and is capable of continuously adjusting a valve opening degree in response to a drive current supplied to a solenoid 32. As described above, the solenoid valve 20 preferably has the main body 21 and the nozzle portion 22.

As shown in FIG. 2, the main body 21 preferably has a casing 31, a solenoid 32, a core 33, a plunger 34, and a rod 35. The casing 31 has an outer wall portion 311 having a substantially cylindrical shape. The solenoid 32, the core 33, the plunger 34 and the rod 35 are received inside the outer wall portion 311.

The solenoid 32 is composed of conductive wires wound around the center axis 9. At least a portion of the core 33, the plunger 34 and the rod 35 are disposed on a radially inner side of the solenoid 32. The plunger 34 is disposed above the core 33. The top surface of the core 33 faces the bottom surface of the plunger 34 in the axial direction. A magnetic material, for example, steel and the like, is used as a material of the core 33 and the plunger 34.

The rod 35 is a substantially columnar member extending along the center axis 9. The plunger 34 and the rod 35 are fixed to each other. The rod 35 is supported by a pair of bearings 36 which are disposed on the upper and lower sides of the plunger 34. With this, the rod 35 is axially movable integrally with the plunger 34.

The nozzle portion 22 preferably has a sleeve 41, a spool valve 42, and a spring 43. The sleeve 41 is a substantially cylindrical member extending along the center axis 9. A lower end portion of the sleeve 41 is closed by a disc shape floor member 410. The sleeve 41 is provided with the oil input port 411, the oil output port 412, two feedback ports 413, and a discharge port 414. Each of these ports 411, 412, 413, 414 connects an inner space of the sleeve 41 with the oil paths outside the sleeve 41.

The spool valve 42 is received inside the sleeve 41. In this preferably embodiment, the spool valve 42 preferably has a spool valve axis 420, a first valve body 421, a second valve body 422, and a third valve body 423. The spool valve axis 420 is a columnar member extending along the center axis 9. Each of the valve bodies 421, 422, 423 is fixed around the spool valve axis 420 and simultaneously in contact with an inner periphery of the sleeve 41.

A lower end portion of the rod 35 is in contact with an upper end portion of the spool valve 42. The spring 43, which is an elastic material, is axially compressed and interposed between a lower end portion of the spool valve 42 and the floor member 410. Therefore, the spool valve 42 and the rod 35 always receive upward pressure from the spring 42.

When the drive current is not supplied to the solenoid 32, the plunger 34, the rod 35, and the spool valve 42 move upward by the pressure received from the spring 43. Meanwhile, when the drive current is supplied to the solenoid 32, the core 33 is magnetized, and therefore the plunger 34 is pulled towards the core 33. Accordingly, the plunger 34, the rod 35, and the spool valve 42 move downward. When the rod 35 moves vertically, positions of the three valve bodies 421, 422, 423 which are fixed to the rod 35 also move vertically. As a result, a flux of oil flowing into the oil output port 412 from the oil input port 411 is changed.

<3. Structure of Solenoid Valve Control System>

Herein, a solenoid valve control system 50, which controls operation of the solenoid valve 20, is explained in detail. The solenoid valve control system 50 is composed of, for example, a circuit board having a plurality of electronic components mounted thereon. A portion of or all functions of the solenoid valve control system 50 may be configured by a microcontroller, or a general-purpose computer.

Figure 3:
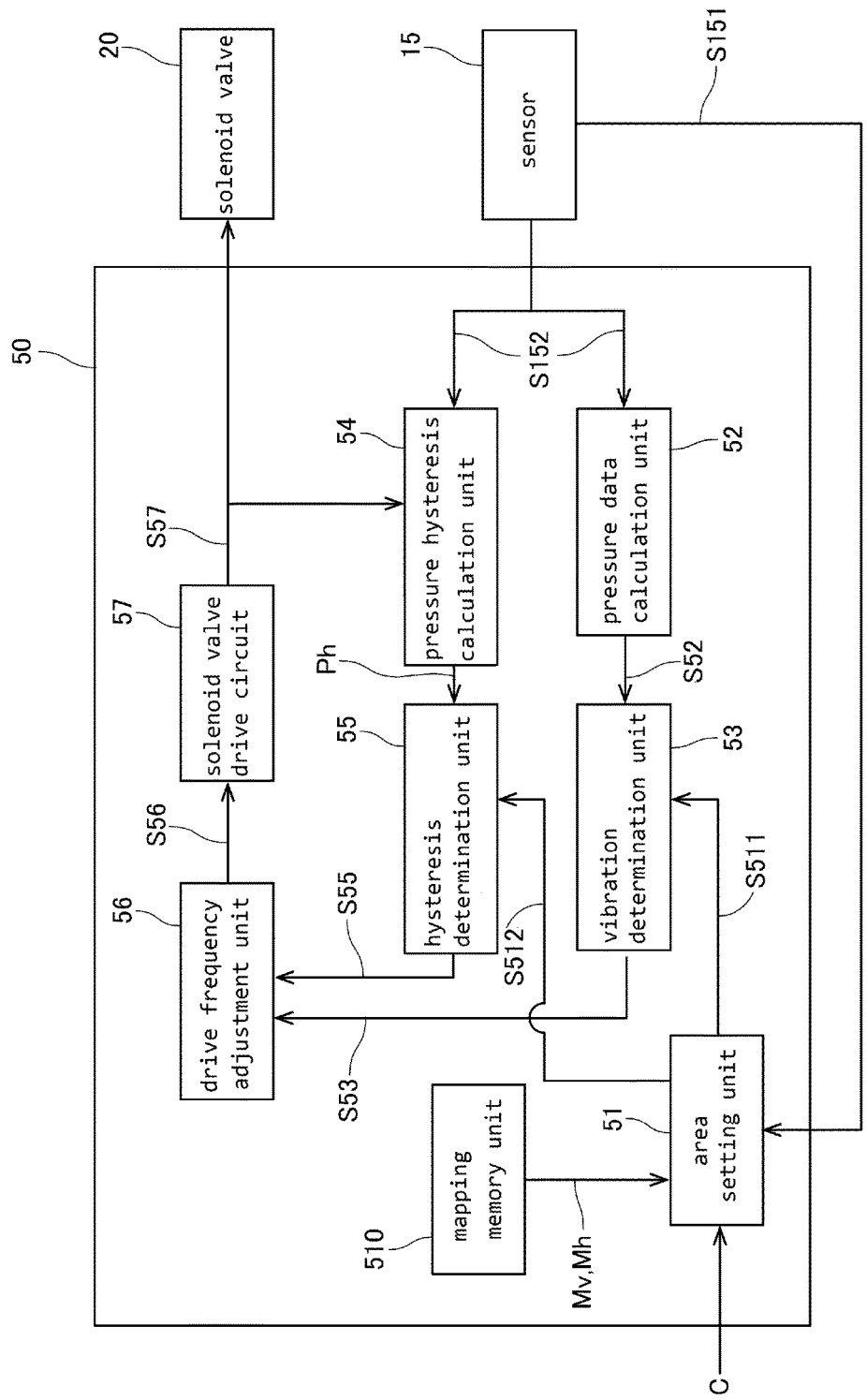
FIG. 3 is a block diagram which illustrates the structure of a solenoid valve control system according to the preferred embodiment.

FIG. 3 is a block diagram showing the structure of the solenoid valve control system 50. As shown in FIG. 3, the solenoid valve control system 50 preferably has an area setting unit 51, a mapping memory unit 510, a pressure data calculation unit 52, a vibration determination unit 53, a pressure hysteresis calculation unit 54, a hysteresis determination unit 55, a drive frequency adjustment unit 56, and a solenoid valve drive circuit 57.

The area setting unit 51 sets conditions to define what is outside a permissible range for each event of oil vibration and hysteresis occurring in the output side of the solenoid valve 20. A vehicle information C is input into the area setting unit 51 from the vehicle, such as an automobile and the like, which is provided with the control valve system 1 and the automatic transmission 2, through an intercommunication means, such as CAN (Controller Area Network) and the like. The vehicle information C includes information related to, for example, vehicle type, type of the automatic transmission 2, and rotational speed of the engine and the like. Based on the input vehicle information C, the area setting unit 51 sets an area outside the pressure data range S511 which is a range under impermissible condition related to oil vibration, and an area outside the pressure hysteresis amount range S512 which is a range under impermissible condition related to hysteresis.

The mapping memory unit 510 stores a plurality of vibration maps Mv, and a plurality of hysteresis maps Mh. Vibration maps Mv and hysteresis maps Mh respectively contain a plurality of threshold information corresponding to the number of engine revolutions and the oil temperature. Specifically, in vibration maps Mv, combinations of a first pressure threshold $\Delta P1$, a second pressure threshold $\Delta P2$, and a cycle threshold T0 are correspondingly assigned to combinations of the number of engine revolutions and the oil temperature on a one-to-one basis. The second pressure threshold $\Delta P2$ value is bigger than the first pressure threshold $\Delta P1$ value. In hysteresis maps Mh, a hysteresis threshold Ph0 is correspondingly assigned to the combinations of the number of engine revolutions and the oil temperature on a one-to-one basis.

In this preferred embodiment, the plurality of vibration maps Mv and hysteresis maps Mh are provided depending on the vehicle type and type of the automatic transmission 2. The area setting unit 51 refers to the vehicle information C input from outside, and retrieves appropriate vibration maps Mv and hysteresis maps Mh for this vehicle information C from the mapping memory unit 510.

The area setting unit 51 acquires oil temperature information S151, which indicates the temperature of the oil, from the sensor 15. The area setting unit 51 refers to vibration maps My and hysteresis maps Mh retrieved from the mapping memory unit 510, and responds to the number of engine revolutions included in the vehicle information C and the oil temperature information S151 acquired from the sensor 15, and determines the first pressure threshold $\Delta P1$, the second pressure threshold $\Delta P2$, the cycle threshold T0, and the hysteresis threshold Ph0. The area setting unit 51 outputs the area outside the pressure data range S511, which is set by the first pressure threshold $\Delta P1$, the second pressure threshold AP2, and the cycle threshold T0, to the vibration determination unit 53. The area setting unit 51 outputs the area outside the pressure hysteresis amount range S512, which is set by the hysteresis threshold Ph0, to the hysteresis determination unit 55.

The pressure data calculation unit 52 interprets an oil pressure value S152 acquired from the sensor 15, and calculates a fluctuation band $\Delta P$ of the pressure value S152 and a fluctuation cycle T of the pressure value S152. The pressure data calculation unit 52 outputs a pressure data S52, which includes this fluctuation band $\Delta P$ and fluctuation cycle T, to the vibration determination unit 53.

The vibration determination unit 53 determines whether or not the pressure data S52 input from the pressure data calculation unit 52 is included in the area outside the pressure data range S511. Specifically, when the fluctuation band $\Delta P$ of the pressure value S152 satisfies a relation of $\Delta P1 < \Delta P$ and the fluctuation cycle T of the pressure value S152 satisfies a relation of $T < T0$, the vibration determination unit 53 makes a determination if the pressure data S52 is included in the area outside the pressure data range S511, which is outside the first predetermined range. That is, the vibration determination unit 53 determines that oil vibration is outside a permissible range. In this case, the vibration determination range S3 outputs a vibration correction signal S53 to the drive frequency adjustment unit 56. Meanwhile, if said conditions are not met, the vibration determination unit 53 determines that oil vibration is within a permissible range. In this case, the vibration determination unit 53 does not output the vibration correction signal S53 to the drive frequency adjustment unit 56.

The pressure hysteresis calculation unit 54 interprets the oil pressure value S152 acquired from the sensor 15, and calculates a pressure hysteresis amount Ph. The pressure hysteresis amount Ph is calculated by, for example, comparing a sequentially monitored interval of the oil pressure value S152, the oil pressure value S152 when the drive current S57 value in the solenoid valve 20 increases, and the oil pressure value S152 when the drive current S57 value in the solenoid valve 20 is decreased to the identical drive current value, and the difference between the two values is therefore referred to as the pressure hysteresis amount Ph. The pressure hysteresis calculation unit 54 outputs the calculated pressure hysteresis amount Ph to the hysteresis determination unit 55.

Further, the pressure hysteresis calculation unit 54 may calculate the difference between the pressure value S152 when the drive current value increases and a preset reference value as the pressure hysteresis amount Ph. The pressure hysteresis calculation unit 54 may calculate the difference between the pressure value S152 when the drive current value is reduced and a preset reference value as the pressure hysteresis amount Ph.

The hysteresis determination unit 55 determines whether or not the pressure hysteresis amount Ph input from the pressure hysteresis calculation unit 54 is included in the area outside the pressure hysteresis amount range S512. Specifically, when the pressure hysteresis amount Ph satisfies a relation of $Ph > Ph0$, and the hysteresis determination unit 55 makes a determination if the pressure hysteresis amount Ph is included in the area outside the pressure hysteresis amount range S512, which is outside the second predetermined range. That is, the hysteresis determination unit 55 determines that the oil pressure hysteresis is outside a permissible range. In this case, the hysteresis determination unit 55 outputs a hysteresis correction signal S55 to the drive frequency adjustment unit 56. Meanwhile, when the above condition is not met, the hysteresis determination unit 55 determines that the oil pressure hysteresis is within a permissible range. In this case, the hysteresis determination unit 55 does not output the hysteresis correction signal S55 to the drive frequency adjustment unit 56.

The drive frequency adjustment unit 56 adjusts a drive frequency f, which is a frequency of the drive current, based on the determination results received from the vibration determination unit 53 and the hysteresis determination unit 55. Specifically, when the vibration correction signal S53 is input from the vibration determination unit 53, the drive frequency adjustment unit 56 increases the drive frequency f to a frequency higher than the drive frequency f of that time. The drive frequency f is set in a range which does not go above a predetermined upper frequency limit f1. When the hysteresis correction signal S55 is input from the hysteresis determination unit 55, the drive frequency adjustment unit 56 reduces the drive frequency f to a frequency smaller than the drive frequency f of that time. The drive frequency f is set in a range which does not go below a predetermined lower frequency limit f2. The drive frequency adjustment unit 56 outputs a drive frequency command signal S56, which includes the information related to the drive frequency f after adjustment, to the solenoid valve drive circuit 57.

The solenoid valve drive circuit 57 generates the drive current S57 on the basis of the drive frequency command signal S56. The solenoid valve drive circuit 57 generates a pulse drive current (PWM signal) in accordance with the drive frequency designated by the drive frequency command signal S56 and a separately designated drive current value. The solenoid valve drive circuit 57 applies the generated drive current S57 to the solenoid valve 20. When the drive current S57 is supplied to the solenoid 32 of the solenoid valve 20, the spool valve 42 of the solenoid valve 20 moves in accordance with this drive current value. As a result, the amount of oil supplied to the automatic transmission 2 is controlled.

<4. Drive Frequency Adjustment Process Flow>

Figure 4:
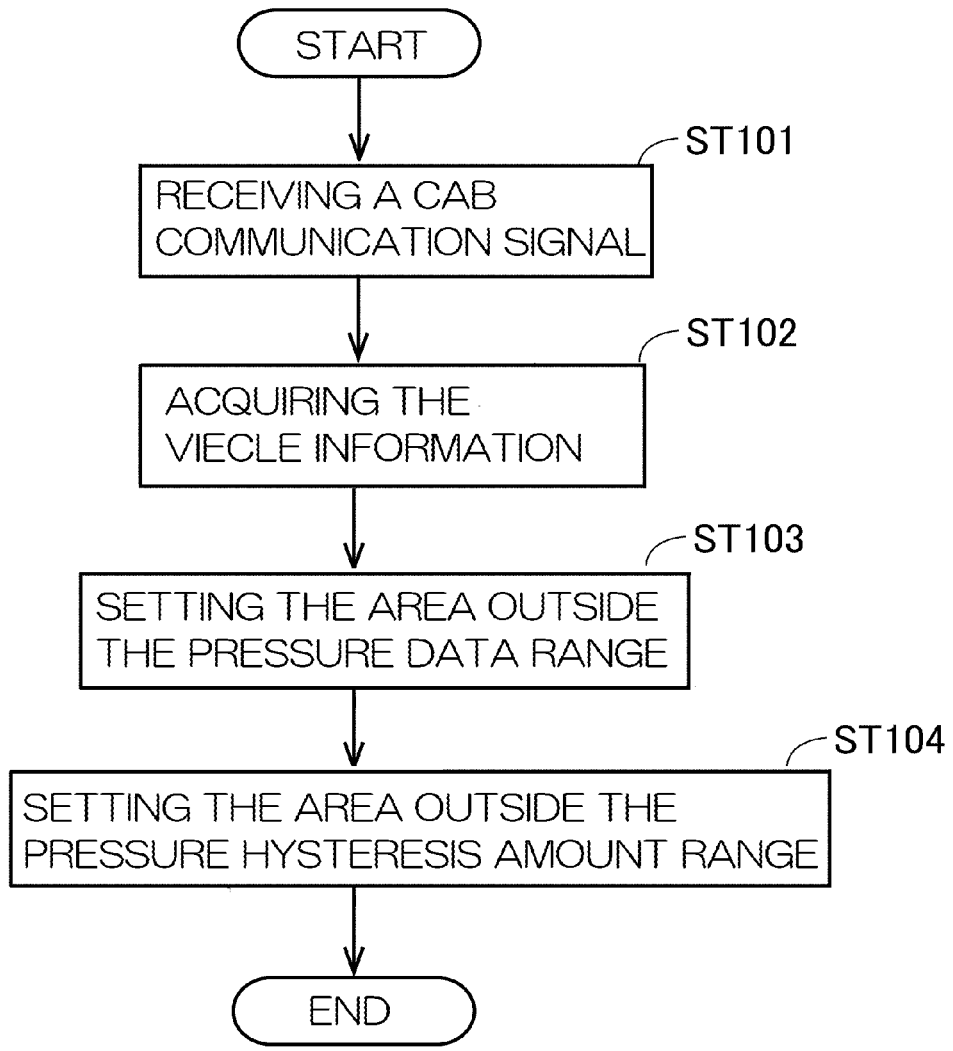
FIG. 4 is a flow chart showing a flow of an initial process of the solenoid valve control system according to the preferred embodiment.
Figure 5:
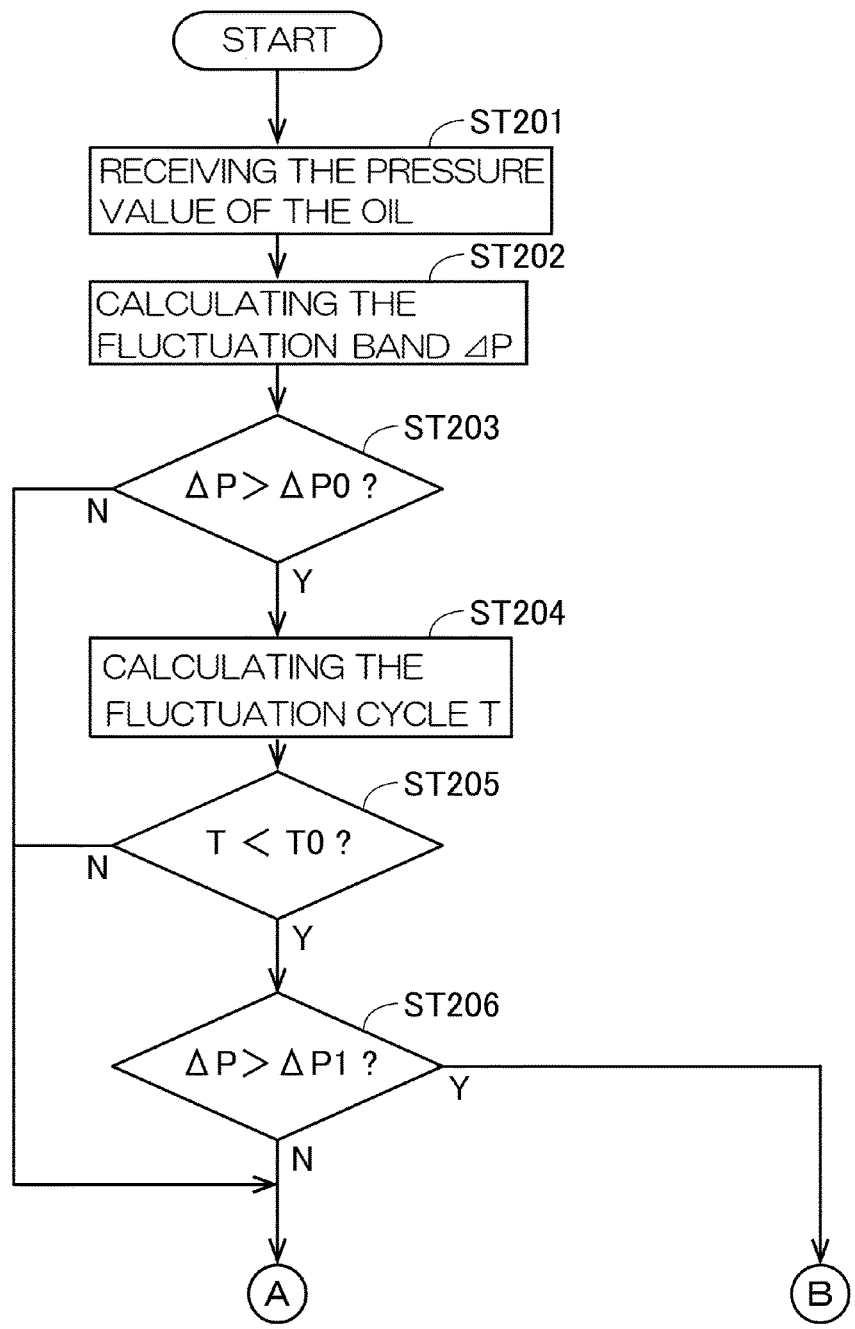
FIG. 5 is a flow chart showing a flow of a periodic process of the solenoid valve control system according to the preferred embodiment.
Figure 6:
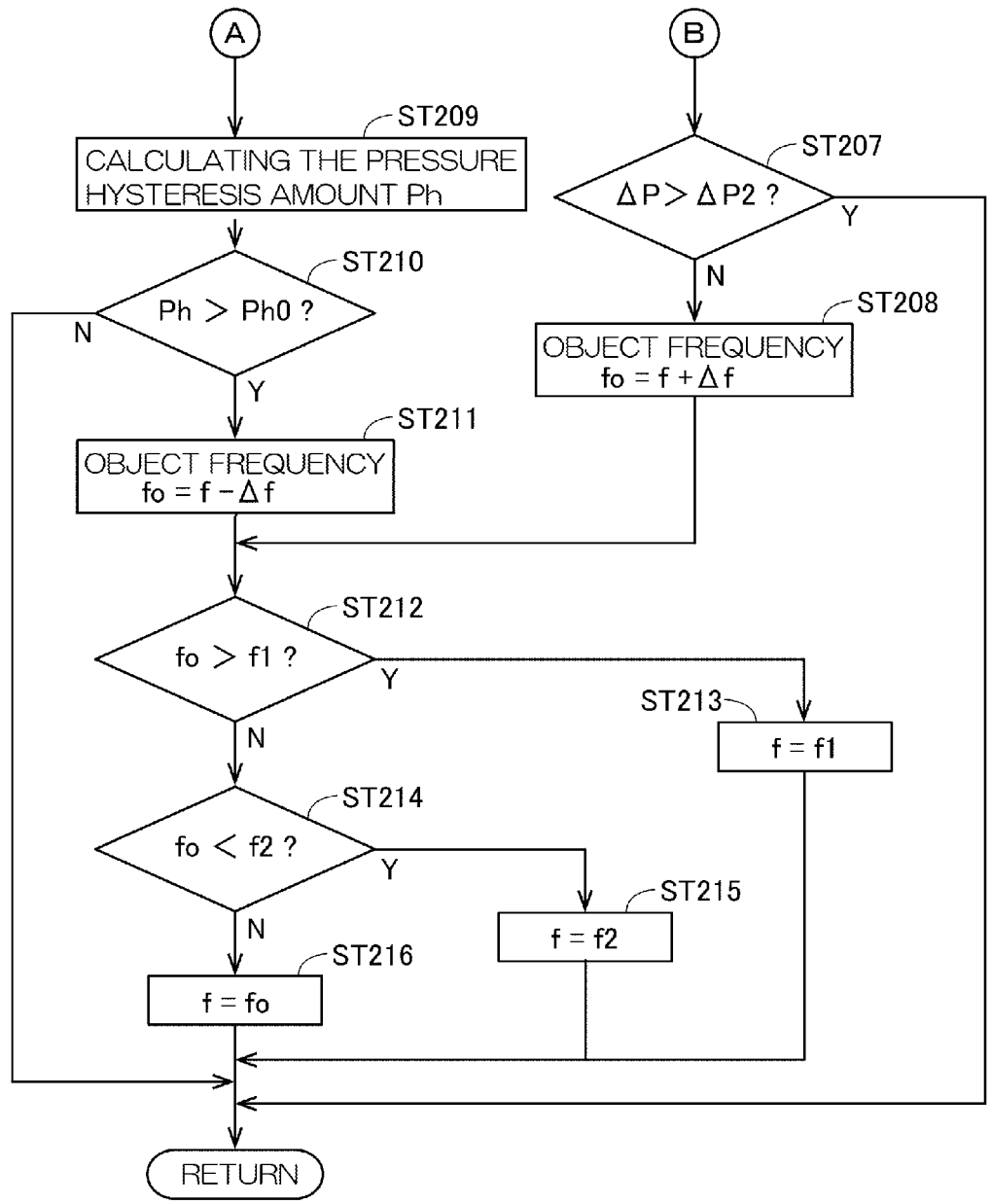
FIG. 6 is a flow chart showing a flow of a periodic process of the solenoid valve control system according to the preferred embodiment.

Subsequently, a drive frequency adjustment process flow of the solenoid valve control system 50 will be explained. FIG. 4 is a flow chart showing a flow of an initial process which is performed when the operation of the control valve system 1 is started. FIG. 5 and FIG. 6 are flow charts showing a flow of a periodic process which is repeated during the operation of the control valve system 1.

In this preferred embodiment, the solenoid valve control system 50 performs the initial process shown in FIG. 4 when the operation of the control valve system 1 is started. Then, the solenoid valve control system 50 repeatedly performs the periodic process shown in FIG. 5 and FIG. 6 in a predetermined interval during the operation of the control valve system 1. The interval of the periodic process may be, for example, 2 [msec].

In the intimal process shown in FIG. 4, first of all, the solenoid valve control system 50 receives a cab communication signal (step ST101). From this cab communication signal, the area setting unit 51 acquires the vehicle information C including vehicle type, type of the automatic transmission 2, and the number of engine revolutions (step ST102).

Subsequently, the area setting unit 51 refers to the vehicle type and the type of automatic transmission 2 included in the vehicle information C, and retrieves appropriate vibration maps Mv and hysteresis maps Mh from the mapping memory unit 510. The area setting unit 51 sets the area outside the pressure data range S511 on the basis of the vibration maps Mv retrieved from the mapping memory unit 510 (step ST103). The first pressure threshold $\Delta P1$, the second pressure threshold $\Delta P2$ and the cycle threshold T0 are respectively set when setting the area outside the pressure data range S511. The area setting unit 51 sets the area outside the pressure hysteresis amount range S512 on the basis of the hysteresis maps Mh retrieved from the mapping memory unit 510 (step ST 104). The hysteresis threshold Ph0 is set when setting the area outside the pressure hysteresis amount range S512.

The set area outside the pressure data range S511 is output to the vibration determination unit 53 from the area setting unit 51. The set area outside the pressure hysteresis range S512 is output to the hysteresis determination unit 55 from the area setting unit 51.

Subsequently, the periodic process will be explained. In the periodic process shown in FIG. 5, first of all, the sensor 15 inside the control valve system 1 detects the oil pressure value in the second oil path 122. Then, the solenoid valve control system 50 receives the pressure value S152 from the sensor 15 (step ST 201).

Then, the solenoid valve control system 50 calculates the pressure data S52 including the fluctuation band $\Delta P$ and the fluctuation cycle T of the pressure value S152. The solenoid valve control system 50 determines whether or not this pressure data S52 is included in the area outside the pressure data range S511 set in step ST103. Specifically, the following process is performed.

First, the pressure data calculation unit 52 interprets the pressure value S152 received in step ST201, and calculates the fluctuation band $\Delta P$ of the pressure value S152 (step ST 202). In step ST202, for example, the difference between the pressure value S152 of the times when the differential value of the pressure value S152 becomes zero may be calculated as the fluctuation band $\Delta P$. The fluctuation band $\Delta P$ of the pressure value S152 may be produced by other calculations.

Subsequently, the vibration determination unit 53 determines whether or not the fluctuation band $\Delta P$ of the pressure value S152 is bigger than a preset vibration threshold $\Delta P0$ (step ST 203). Here, the vibration threshold $\Delta P0$ is a threshold smaller than the first pressure threshold $\Delta P1$, and is preset in the solenoid valve control system 50. When the fluctuation band $\Delta P$ is equal to or smaller than the vibration threshold $\Delta P0$, oil vibration seldom occurs. For this reason, when $\Delta P$ is equal to or smaller than $\Delta P0$ (that is, when the result of step ST203 is 'No'), the determination process related to whether or not oil vibration is occurred (step ST204, step ST205, and step ST 206) is omitted, and the process moves forward to Branch A shown in FIG. 5.

When $\Delta P$ is bigger than $\Delta P0$ (that is, when the result of step ST203 is 'Yes'), the pressure data calculation unit 52 interprets the pressure value S152 received in step ST201, and calculates the fluctuation cycle T of the pressure value S152 (step ST204). In step ST204, for example, the interval between the times when the differential value of the pressure value S152 becomes zero may be calculated as the fluctuation cycle T. The fluctuation cycle T of the pressure value S152 may be produced by other calculations.

Subsequently, the vibration determination unit 53 determines whether or not the fluctuation cycle T of the pressure value S152 is smaller than the cycle threshold T0 (step ST 205). When the fluctuation cycle T of the pressure value S152 is equal to or bigger than the cycle threshold T0, harmful effect caused by oil vibration seldom occurs since the oil pressure change is gradual. For this reason, when T is equal to or bigger than T0 (that is, when the result of step ST205 is 'No'), the vibration determination unit 53 makes a determination if the pressure data S52 is not included in the area outside the pressure data range S511. Accordingly, the next process of step ST206 is omitted, and the process moves forward to step ST209 which is shown below Branch A in FIG. 5 and FIG. 6.

Meanwhile, when T is smaller than T0 (that is, when the result of step ST205 is 'Yes'), the vibration determination unit 53 determines whether or not the fluctuation band $\Delta P$ of the pressure value S152 is bigger than the first pressure threshold $\Delta P1$ (step ST206). When the fluctuation band $\Delta P$ of the pressure value S152 is equal to or smaller than the first pressure threshold $\Delta P1$, harmful effect caused by oil vibration seldom occurs since the oil pressure change is gradual. For this reason, when ΔP is equal to or smaller than ΔP1 (that is, when the result of step ST206 is 'No'), the vibration determination unit 53 makes a determination if the pressure data S52 is not included in the area outside the pressure data range S511, and the process moves forward to Branch A shown in FIG. 5.

Meanwhile, when ΔP is bigger than ΔP1, the cycle of oil vibration is short and the amplitude of oil vibration is big, and therefore the vibration determination unit 53 determines that oil vibration needs to be suppressed. That is, the vibration determination unit 53 makes a determination if the pressure data S52 is included in the area outside the pressure data range S511, and the vibration determination unit 53 performs the process of step ST207 which is shown below Branch B in FIG. 5 and FIG. 6.

When the process moves forward to Branch B as shown in FIG. 6, the vibration determination unit 53 first determines whether or not the fluctuation band ΔP of the pressure value S152 is bigger than the second pressure threshold ΔP2 (step ST207). When the fluctuation band ΔP of the pressure value S152 is bigger than the second pressure threshold ΔP2, the amplitude of oil vibration is excessively big, and therefore it is not easy to achieve the effect of suppressing oil vibration even if the drive frequency is increased. For this reason, when ΔP is bigger than ΔP2 (that is, when the result of step ST207 is 'Yes'), the vibration determination unit 53 determines that it is impossible to control oil vibration. In this case, the vibration determination unit 53 does not input the vibration correction signal S53 to the drive frequency adjustment unit 56. That is, the solenoid valve control system 50 maintains the current state of the drive frequency f, and waits for the next periodic process.

Meanwhile, when the fluctuation band ΔP of the pressure value S152 is equal to or less than the second pressure threshold ΔP2, it is possible to control oil vibration. Therefore, when ΔP is equal to or smaller than ΔP2 (that is, when the result of step ST207 is 'No'), the vibration determination unit 53 outputs the vibration correction signal S53 to the drive frequency adjustment unit 56. When the vibration correction signal S53 is input, the drive frequency adjustment unit 56 changes an object frequency fo to a frequency higher than the current drive frequency f, wherein fo=f+Δf (step ST 208). The drive frequency adjustment unit 56 performs the process of step ST212 with the object frequency fo. Further, Δf refers to a changed amount of the drive frequency f, and is preset in the solenoid valve control system 50.

Meanwhile, when the process moves forward to steps below Branch A from step ST203, step ST204, or step ST206, then the pressure hysteresis calculation unit 54 interprets the pressure value S152 received in step ST201, and calculates the pressure hysteresis amount Ph (step ST209). The hysteresis determination unit 55 determines whether or not the pressure hysteresis amount Ph is bigger than the hysteresis threshold Ph0 (step ST 210).

When the pressure hysteresis amount Ph is equal to or lower than the hysteresis threshold Ph0, harmful effect caused by oil pressure hysteresis seldom occurs. Therefore, when Ph is equal to or smaller than Ph0 (that is, when the result of step ST210 is 'No'), the hysteresis determination unit 55 makes a determination if the pressure hysteresis amount Ph is not included in the area outside the pressure hysteresis amount range S512. In this case, the hysteresis determination unit 55 does not input the hysteresis correction signal S55 to the drive frequency adjustment unit 56.

That is, the solenoid valve control system 50 maintains the current state of the drive frequency f, and waits for the next periodic process.

Meanwhile, when Ph is bigger than Ph0 (that is, when the result of step ST210 is 'Yes'), the hysteresis determination unit 55 determines that the oil pressure hysteresis needs to be suppressed. That is, the hysteresis determination unit 55 makes a determination if the pressure hysteresis amount Ph is included in the area outside the pressure hysteresis amount range S512. In this case, the hysteresis determination unit 55 outputs the hysteresis correction signal S55 to the drive frequency adjustment unit 56. When the hysteresis correction signal S55 is input, the drive frequency adjustment unit 56 changes the object frequency fo to a frequency lower than the current drive frequency f, wherein, fo=f-Δf (step ST211).

Further, in this embodiment, the changed amount Δf of the drive frequency f in step ST208 and the changed amount Δf of the drive frequency f in step ST211 have identical value. However, the changed amount of the drive frequency f in step ST208 may be different from the changed amount of the drive frequency f in step ST212.

Subsequently, the drive frequency adjustment unit 56 determines whether or not the object frequency fo changed in step ST208 or step ST 211 is higher than the predetermined upper frequency limit f1 (step ST212). When fo is higher than f1 (that is, when the result of step ST212 is 'Yes'), the drive frequency adjustment unit 56 sets the upper frequency limit f1 to a new drive frequency f (step ST213), and waits for the next periodic process. Accordingly, the drive frequency f is inhibited from becoming excessively high.

When fo is equal to or lower than f1 (that is, when the result of step ST212 is 'No'), the drive frequency adjustment unit 56 determines whether or not the object frequency fo is lower than the predetermined lower frequency limit f2 (step ST214). When fo is lower than f2 (that is, when the result of step ST214 is 'Yes'), the drive frequency adjustment unit 56 sets the lower frequency limit f2 as a new drive frequency f (step ST215), and waits for the next periodic process. Accordingly, the drive frequency f is inhibited from becoming excessively low.

When fo is equal to or higher than f2 (that is, when the result of step ST214 is 'No'), the drive frequency adjustment unit 56 sets the object frequency fo as a new drive frequency f (step ST216), and waits for the next periodic process.

On the basis of the drive frequency f set by the periodic process described above, the drive frequency adjustment unit outputs the drive frequency command signal S56 to the solenoid valve drive circuit 57. The solenoid valve drive circuit 57 outputs the pulse drive current S57 having the drive frequency f to the solenoid valve 20.

Since the periodic process is repeated in the solenoid valve control system 50 as described above, oil vibration and hysteresis on the output side of the solenoid valve 20 can be suppressed within a permissible range, in accordance with environmental conditions such as the type of automatic transmission 2 to be controlled, vehicle type, number of engine revolutions and the like.

<5. Modification>

Although an exemplary embodiment for implementing the present disclosure is explained above, the present disclosure is not limited thereto.

In step ST203 of the preferred embodiment, the fluctuation band ΔP if the pressure value S152 is compared to the vibration threshold ΔP0, and when the fluctuation band ΔP if the pressure value S152 is small enough, step ST204, step ST205, and step ST206 are omitted. With this, efficiency of the process in the solenoid valve control system 50 can be enhanced. The determination process in step ST203 may be omitted. However, even when step ST203 is omitted, the adjustment result of the drive frequency f would be the same as when step ST203 is performed.

In the preferred embodiment, the first pressure threshold ΔP1, the second pressure threshold ΔP2, the cycle threshold T0, and the hysteresis threshold Ph0 are all set during the initial process. However, theses thresholds may be set during periodic process, by taking the oil temperature information or the change in number of engine revolutions into consideration.

In the preferred embodiment, the vibration determination unit 53 determines whether or not the pressure data S52 is included in the area outside the pressure data range S511, and then determines whether or not the pressure hysteresis amount Ph is included in the area outside the pressure hysteresis amount range S512. However, the order of these steps may be reversed. That is, it is possible to determine whether or not the pressure hysteresis amount Ph is included in the area outside the pressure hysteresis amount range S512, and then determine whether or not the pressure data S52 is included in the area outside the pressure data range S511.

Shape of the details of the solenoid valve may be different from the shape illustrated in the drawings of the present disclosure.

The present disclosure is used in a solenoid valve control system, a control valve system, and a method of controlling a solenoid valve. The solenoid valve drive circuit may apply not only the pulse drive current but also other-shaped drive current to the solenoid valve. The solenoid valve may be driven by so-called analog current drive control.

Features of the above-described preferred embodiments and the modifications thereof may be combined appropriately as long das no conflict arises.

While preferred embodiments of the present invention have been described above, it is to be understood that variations and modifications will be apparent to those skilled in the art without departing from the scope and spirit of the present invention. The scope of the present disclosure, therefore, is to be determined solely by the following claims.

What is claimed is:

1. A solenoid valve control system for controlling a solenoid valve interposed between an input side and an output side of a flow path for oil, comprising:
   a solenoid valve drive circuit which applies a drive current to the solenoid valve based on designated drive current value and drive frequency;
   a pressure data calculation unit which calculates a pressure data including a pressure fluctuation band and a pressure fluctuation cycle from a pressure value of the oil on the output side of the solenoid valve;
   a pressure hysteresis calculation unit which calculates a difference between the pressure value when the drive current value is increased and the pressure value when the drive current value is decreased as a hysteresis amount;
   a vibration determination unit which determines whether or not the pressure data is included in an area outside a pressure data range, which is outside a first predetermined range;
   a hysteresis determination unit which determines whether or not the pressure hysteresis amount is included in an area outside a pressure hysteresis amount range, which is outside a second predetermined range; and
   a drive frequency adjustment unit which adjusts a drive frequency based on the determination result from the vibration determination unit and the hysteresis determination unit.

2. The solenoid valve control system according to claim 1,
   wherein the vibration determination unit determines that the pressure data is included in the area outside the pressure data range when the pressure fluctuation band is bigger than a preset first pressure threshold, and the pressure fluctuation cycle is smaller than a preset cycle threshold.

3. The solenoid valve control system according to claim 2,
   wherein the vibration determination unit determines an uncontrollable state when the pressure fluctuation band is bigger than a second pressure threshold which is bigger than the first pressure threshold, and when the vibration determination unit determines an uncontrollable state, the drive frequency adjustment unit maintains the drive frequency.

4. The solenoid valve control system according to claim 1,
   wherein the drive frequency adjustment unit changes an object frequency to a frequency higher than the current drive frequency when the vibration determination unit determines that the pressure data is included in the area outside the pressure data range, and changes the object frequency to a frequency lower than the current drive frequency when the hysteresis determination unit determines that the pressure hysteresis amount is included in the area outside the pressure hysteresis amount range.

5. The solenoid valve control system according to claim 4,
   wherein, when the changed object frequency is higher than a predetermined upper frequency limit and lower than a predetermined lower frequency limit, the drive frequency adjustment unit sets the changed object frequency as the drive frequency,
   wherein, when the changed object frequency is lower than the lower frequency limit, the lower frequency limit is set as the drive frequency, and
   when the changed object frequency is higher than the upper frequency limit, the upper frequency limit is set as the drive frequency.

6. The solenoid valve control system according to claim 1,
   further comprising an area setting unit which sets the area outside the pressure data range and the area outside the pressure hysteresis amount range based on information input from outside.

7. A control valve system for supplying drive oil to an automatic transmission, comprising:
   a valve body having an oil path inside thereof;
   a solenoid valve interposed in the oil path;
   the solenoid valve control system described in claim 6 which controls the solenoid valve; and
   a sensor which measures oil pressure inside the oil path on the output side of the solenoid valve.

8. The control valve system according to claim 7,
   wherein information of a vehicle, on which the automatic transmission is mounted, is provided to the area setting unit, and the area setting unit sets the area outside the pressure data range and the area outside the pressure hysteresis amount range based on the information of the vehicle.

9. The control valve system according to claim 8, wherein number of engine revolutions of the vehicle and oil temperature information which indicates the temperature of the oil are input to the area setting unit, and the area setting unit sets the area outside the pressure data range and the area outside the pressure hysteresis amount range based on the number of engine revolutions and the oil temperature information.

10. A method of controlling a solenoid valve by applying drive current to the solenoid valve interposed between an input side and an output side of a flow path of oil, comprising:
  a) a pressure detection step for detecting a pressure value of the oil on the output side of the solenoid valve;
  b) subsequent to step a), a pressure data calculation step for calculating a pressure data including a pressure fluctuation width and a pressure fluctuation cycle from the pressure value;
  c) subsequent to step b), a vibration determination step for determining whether or not the pressure data is included in an area of pressure data range outside a first predetermined range;
  d) subsequent to step c), a pressure hysteresis calculation step for calculating a pressure hysteresis amount from a pressure value difference between the increasing and decreasing of the drive current value;
  e) subsequent to step d), a hysteresis determination step for determining whether or not the pressure hysteresis amount is included in an area of pressure hysteresis amount range outside a second predetermined range; and
  f) a drive frequency adjustment step for adjusting a drive frequency of the drive current based on the determination results of step c) and step e).

* * * * *